United States Patent [19]
Oldfield

[11] Patent Number: 5,555,048
[45] Date of Patent: Sep. 10, 1996

[54] DUAL FLOATING GEAR SYSTEM FOR A FILM TRANSPORT MECHANISM

[75] Inventor: Lee D. Oldfield, Rochester, N.Y.

[73] Assignee: Eastman Kodak Company, Rochester, N.Y.

[21] Appl. No.: 376,323

[22] Filed: Jan. 20, 1995

[51] Int. Cl.⁶ .................................................. G03B 1/18
[52] U.S. Cl. ...................... 354/173.1; 354/213
[58] Field of Search ........................... 354/173.1, 173.11, 354/212, 213

[56] References Cited

U.S. PATENT DOCUMENTS 5,456,419 10/1995 Ezawa .................................. 354/173.1

Primary Examiner—David M. Gray
Attorney, Agent, or Firm—Peter J. Bilinski

[57] ABSTRACT

A film transporting apparatus for moving film between a film cartridge and a take-up spool includes a bi-directional motor rotatable in a first direction and a second direction opposite to the first direction, a driving gear engaged with the motor and rotatable in a first and a second direction in response to the direction of rotation of said motor, and a pair of displaceable gears engageable with said driving gear for selectively engaging said film cartridge. According to the invention, each of the pair of displaceable gears is independently movable so as to move into and out of engagement with the film cartridge depending on the direction of rotation of the bi-directional motor to allow either winding and rewinding of film out of and into the cartridge. In a preferred arrangement, the displaceable gears are each movable along a slotted path provided in the camera frame.

2 Claims, 4 Drawing Sheets

5,555,048

DUAL FLOATING GEAR SYSTEM FOR A FILM TRANSPORT MECHANISM

FIELD OF THE INVENTION

The invention relates generally to the field of photography, and in particular to cameras having motorized film transport mechanisms for winding and rewinding film.

BACKGROUND OF THE INVENTION

It is conventionally known in the field of photography to use a contained single bi-directional motor for winding and rewinding photographic film in a 35 mm camera. For example, in commonly assigned U.S. Pat. No. 5,323,197, an associated gear train attached to the output pinion of the bi-directional motor interconnects the film cartridge spool and the take up spindle to cause film to either be pulled from the cartridge and onto the take-up spool, or to be rewound into the confines of the cartridge. The gear train includes a single swing gear which is selectively engageable with the film cassette spool to allow film rewinding depending on the direction of the motor.

With the advent of so-called "thrust" type film cartridges, such as those described in U.S. Pat. Nos. 5,359,378, 5,248,108, and 5,031,855, among others, film transport systems have been provided which allow film to be initially driven or thrust from the interior of the cartridge for winding of the film onto the take-up spool, rather than requiring a user or manufacturer to first cinch an extending leader portion of the filmstrip onto the takeup spool before energizing the bi-directional motor to wind the film. In U.S. application Ser. No. 07/678,216, a gear train includes a pair of movable gears which are separately engageable with the film cartridge spool to allow film to be thrust from the cartridge and onto the take-up spool, or to allow film to be rewound. The gears are each in rotational contact with a driving gear and are connected to each other by means of an extension arm. This arm is pivotable to allow one of the swing gears to engage the film cartridge spool when the output pinion of the motor is rotated in a film advancing direction, thereby creating the thrust mode, and the other swing gear to engage the film cartridge spool when the output pinion is rotated in a film rewinding direction, allowing film rewinding. Additional parts, particularly the pivotable extension arm, must be added to the camera, adding increased cost and size thereto, and in which savings in cost and material are always desirable.

SUMMARY OF THE INVENTION

The present invention is directed to overcoming one or more of the problems set forth above. Briefly summarized, according to one aspect of the present invention, there is provided an apparatus for moving a filmstrip between a film cartridge and a takeup spool comprising a bi-directional motor rotatable in a first direction and a second direction opposite the first direction; a driving gear engaged with said motor which is rotatable in a first and a second direction depending on the rotation of said motor; and a pair of displaceable gears engaged with said driving gear and selectively engageable with said film cartridge, characterized in that:

each of said displaceable gears are independently movable to allow movement into and out of engagement with the film cartridge for winding and rewinding of film out of and into the cartridge. In a preferable configuration, each of the displaceable gears are movable along a slotted path.

By allowing independent movement of each of the swing gears to selectively move into and out of engagement with the cartridge driving elements, particularly by providing slotted paths for the gears in the camera body, as opposed to a swing plate or other attachment means, there are realized savings in the size and cost of an associated camera.

These and other aspects, objects, features and advantages of the present invention will be more clearly understood and appreciated from a review of the following Detailed Description of the Preferred Embodiments and appended claims, and by reference to the accompanying Drawings.

DETAILED DESCRIPTION OF THE INVENTION

Figure 1:
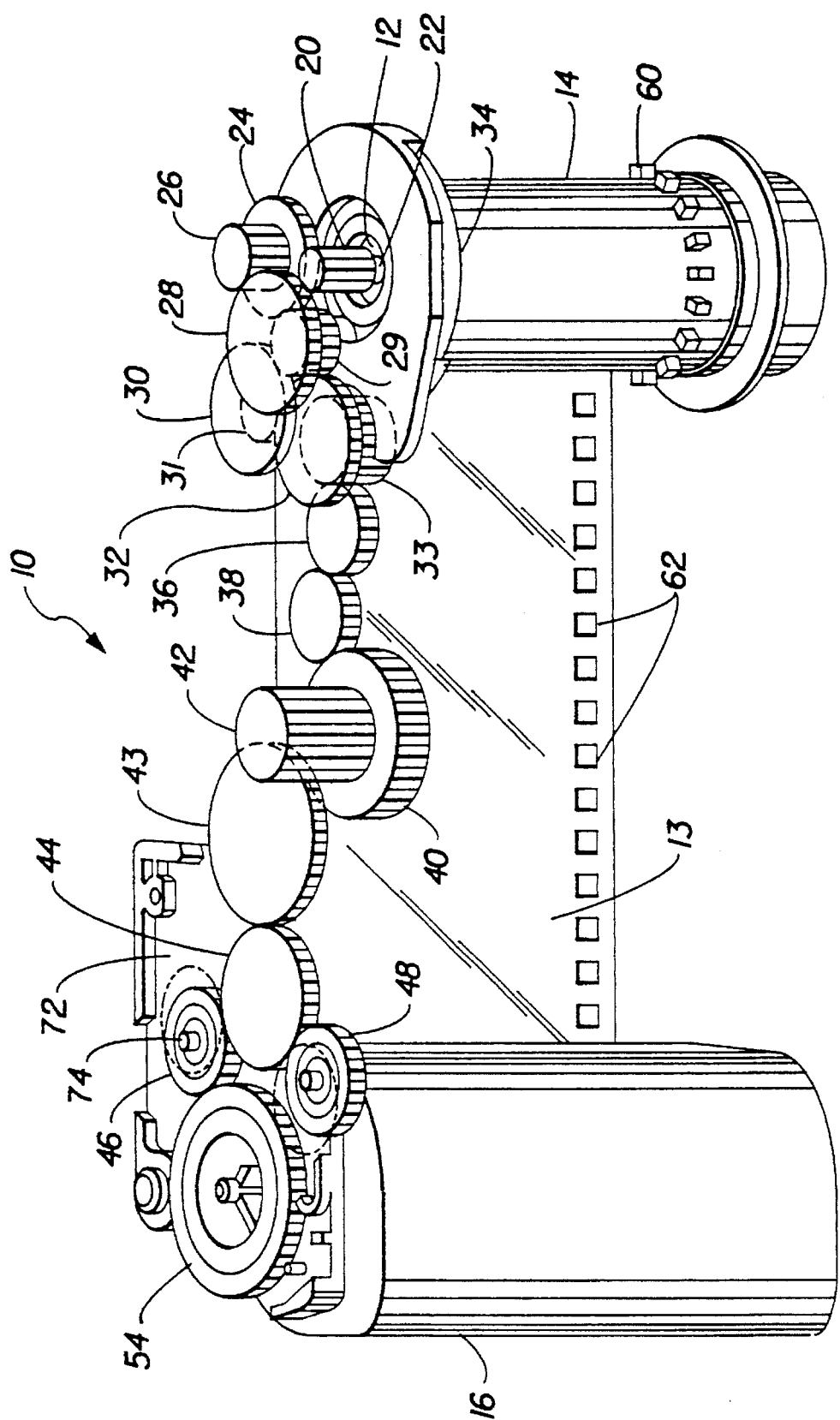
FIG. 1 is a top perspective view of a preferred embodiment of a film transporting apparatus according to the present invention.

Referring to FIG. 1, a film transporting apparatus 10 is illustrated which includes a bi-directional motor 12 operatively connected to a take-up spool 14 and coupled to a film cartridge film spool contained within a thrust-type film cartridge 16.

The film transporting apparatus 10 is contained within the body of a photographic camera, a portion of which is shown in FIG. 1. Additional discussion as to these and other features common to camera do not form a part of the present invention, and are therefore not required. Thrust type film cartridges, such as those described more specifically in commonly assigned U.S. Pat. Nos. 4,938,429 and 5,200,777 are also known to those of ordinary skill in the field and require no further specific description with regard to the present invention. Specific details, however, pertaining to the cartridge and operation of the cartridge can be found in the above noted patents, which are hereby incorporated by reference.

The bi-directional motor 12 is adapted to rotate in a first direction to wind a photographic film 13 onto the take-up spool 14 and to rotate in a second direction opposite the first direction to wind the photographic film onto a film spool (not shown) in the film cartridge 16. A conventional control circuit (not shown) is adapted to activate and to cause the bi-directional motor 12 to rotate in its first and second directions.

A motor pinion gear 20 is connected to a motor shaft 22. The motor pinion 20 is in mesh engagement with a gear 24 having an integral pinion gear 26 which is in mesh engagement with a gear 28. Gear 28 includes an integral pinion gear 29, FIG. 2, which is in mesh engagement with a gear 30. A pinion gear 31 is made integral with the gear 30, and in mesh engagement with a gear 32. Gear 32 is in mesh engagement with a take-up spool gear 34, via pinion gear 33, and attached to the take-up spool 14, This gear train 23 causes a photographic film strip 58 to be wound onto the take-up spool 14 in response to the bi-directional motor 12 rotating in its first direction, The take-up spool 14 can include any conventional means for capturing the photographic film. For example, at least one hook 60 projecting above the periphery of the take-up spool 14 engages a film perforation 62 in the photographic film 58.

According to the present invention, the pinion gear 33 is also in mesh engagement with a gear 36, as best illustrated in FIG. 1, which is in mesh engagement with a gear 38. The gear 38 is in mesh engagement with a gear 40 having a pinion gear 42. The pinion gear 42 is in mesh engagement with a gear 43, shown only in FIG. 1, which is in mesh engagement with a driving gear 44 in mesh engagement with a pair of displaceable gears 46, 48. The driving gear 44 is adapted to rotate in a first direction and a second direction in response to rotation of the bi-directional motor 12 in its first and second directions, respectively.

Each of the displaceable gears 46, 48 are adapted to rotate around the driving gear 44 along a predetermined path between a first position, where either displaceable Gear is disengaged from a spindle gear 54, and a second position, shown in phantom in FIG. 1, where either of the gears 46, 48 are in mesh engagement with the spindle gear 54 in response to rotation of the driving gear 44 in its first direction and its second directions, respectively. The spindle gear 54 is attached to the film spool (not shown) in the thrust film cartridge 16. Details of the thrust components are described in the U.S. Pat. Nos. 4,938,429 and 5,200,777 which were incorporated specifically by reference above.

Figure 2:
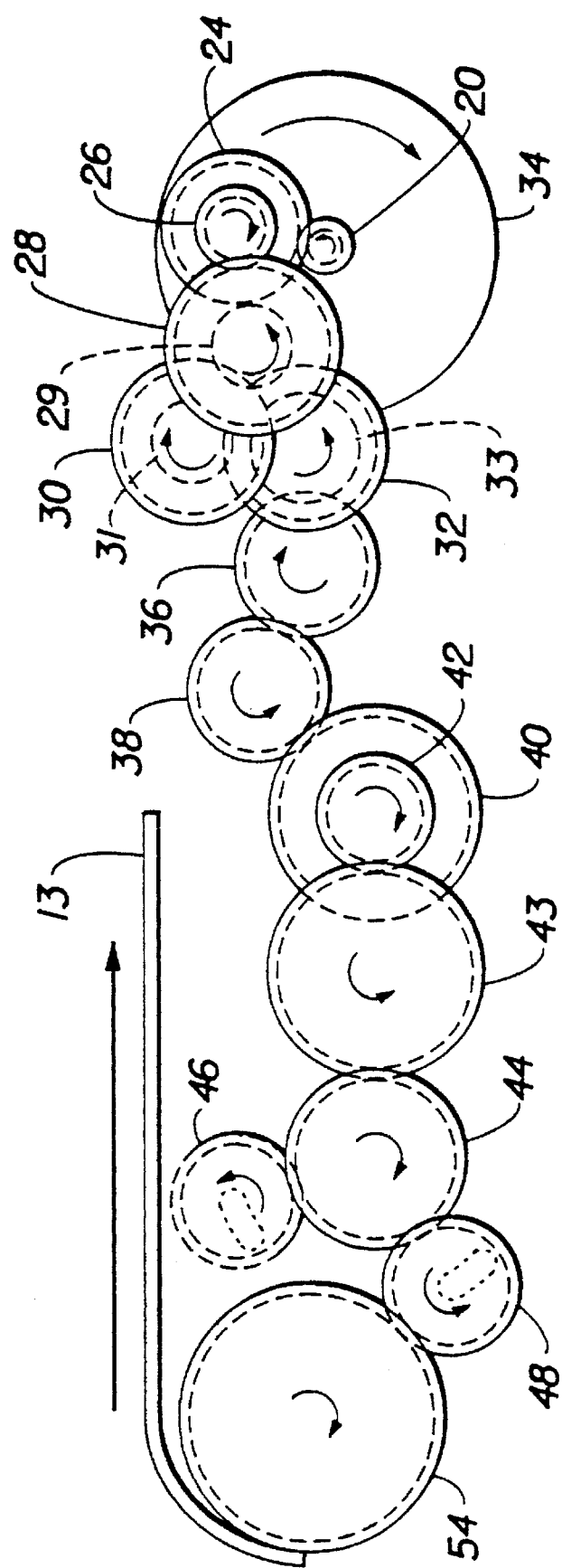
FIG. 2 is a top partial diagrammatic view of the film transporting apparatus of FIG. 1 shown as film is initially thrust from a loaded film cartridge.

According to the preferred embodiment of the present invention, the predetermined path of each of the displaceable gears 46, 48 is defined by respective channels or slots 50, 51, shown in FIG. 2, formed in a housing or gear plate 72 and in the cover plate (not shown) of the camera. Each of the displaceable gears 46, 48 include a shaft 74 protruding above and below each displaceable gear. The protruding ends of the shaft 74 rotate within the channels 50, 51 and are confined therein as each of the displaceable gears 46, 48 rotate around the driving gear 44.

Turning to the diagrammatic FIGS. 2–4, the method of operation of the film transporting apparatus 10 will now be described. For purposes of the following discussion, the gear 43, shown in FIG. 1, is removed from the illustrated gear train 23. Therefore, for compactness the driving gear 44 is in mesh engagement with the pinion gear 42.

Referring now specifically to FIG. 2, the filmstrip 13 is thrust from the cartridge 16 by initiation of the bi-directional motor 12, via activation of the control circuit (not shown), such as by an external switch (not shown) on the body of the camera. The motor 12 and thereby the output motor shaft 22 is caused to rotate in a first (clockwise, according to this embodiment) direction, per arrows 70, engaging the pinion gear 20 and causing each of the components of the gear train 23 to rotate in a complementary fashion. Respective rotations of the drive components of the gear train 23 cause the take-up gear 34 to rotate in a counterclockwise (as shown) film winding direction, due to the engagement of gear 32.

On the other side of the gear train 23, gear 38 engages gear 40 and integral pinion gear 42 engages the driving gear 44, causing the driving gear 44 to rotate in a counterclockwise direction. The counterclockwise rotation of the driving gear 44 causes each of the displaceable gears 46, 48 to rotate in and translate in a counterclockwise fashion, thereby moving each of the displaceable gears 46, 48 within their respective channels 50, 51, bringing the first displaceable gear 46 into engagement with the spindle gear 54, and causing the spindle gear to rotate in a counterclockwise direction. Rotation of the spindle gear 54 as described causes the photographic film 13 contained within the cartridge 16 to unwind from the spool (not shown) and be thrusted from the cartridge 16, as shown by arrow 66. In the meantime, the second displaceable gear 48 remains engaged with the driving gear 44, but is not engaged with the spindle gear 54.

Figure 3:
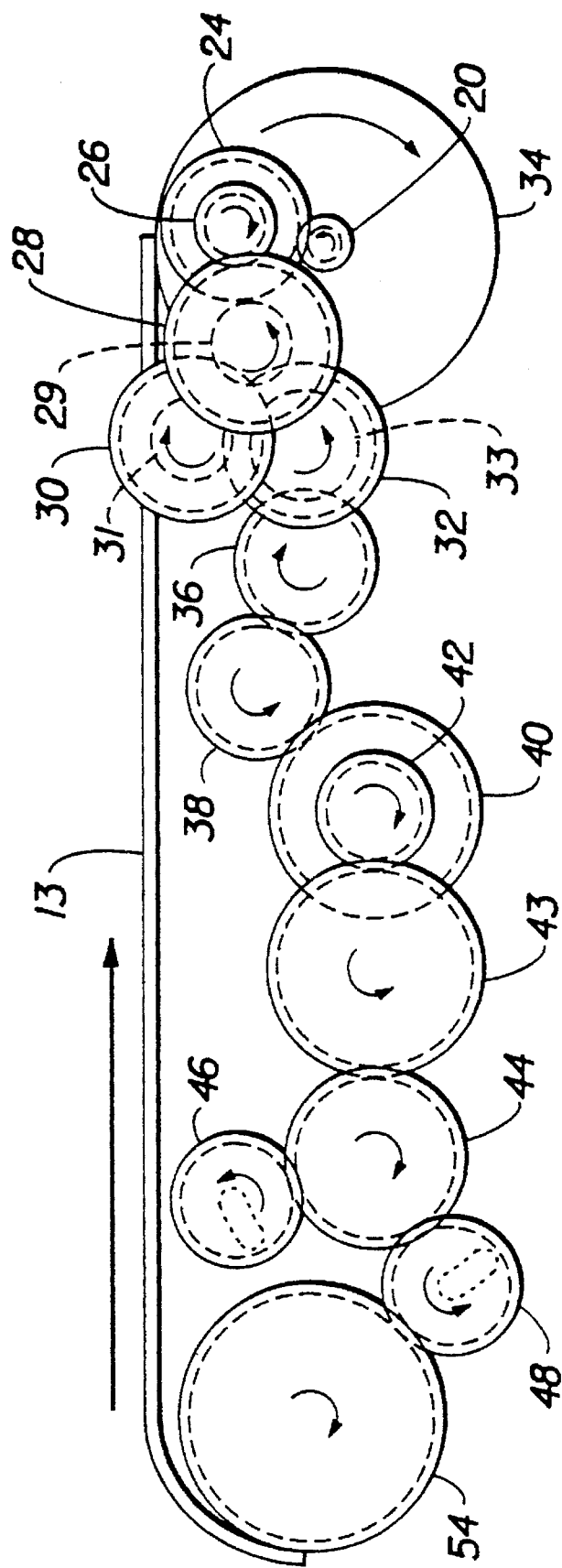
FIG. 3 is the top partial diagrammatic view of FIG. 2 illustrating the disconnection of the film cartridge spool from the driving elements of the gear train.

Referring more specifically to FIGS. 1 and 3, the leading portion of the filmstrip 13 advances where it is taken up by the rotating take-up spool 14, in a conventional manner, such as by engagement of the perforations 62 with the extending hooks 60. The takeup spool 14, due to the gearing ratio of the described gear train 23, is preferably rotating at a faster speed than the spindle gear 54, therefore, once the filmstrip 13 is taken up by the take-up spool 14, the film 13 is pulled from the film cartridge 16 at a faster rate than previously imparted to the spindle gear 54 by the driving gear 44. The corresponding increase in speed of the cartridge spool(not shown) as the film 13 is pulled therefrom is imparted to the spindle gear 54, causing the first displaceable gear 46 to be overridden, or slipped from engagement with the spindle gear, as shown by arrows 76.

In summary, and upon cinching of the film 13 with the take-up spool 14, there is no longer a drive component acting on the film cartridge 16 from the gear train 23. Instead, the filmstrip 13 is withdrawn from the cartridge 16 solely due to the rotation and pulling action of the takeup spool 14, and not from the thrust action supplied to the spindle gear 54 and cartridge 16 by the bi-directional motor 12 and associated gear train 23. Subsequently, as the filmstrip 13 is being advanced in a frame by frame manner across the film gate of the camera (not shown) in a manner conventionally known, the filmstrip is not being thrust from the cartridge 16 by the engagement of the driving gear 44 and first displaceable gear 46 with the spindle gear 54, but is pulled by the rotation of the takeup spool 14.

Figure 4:
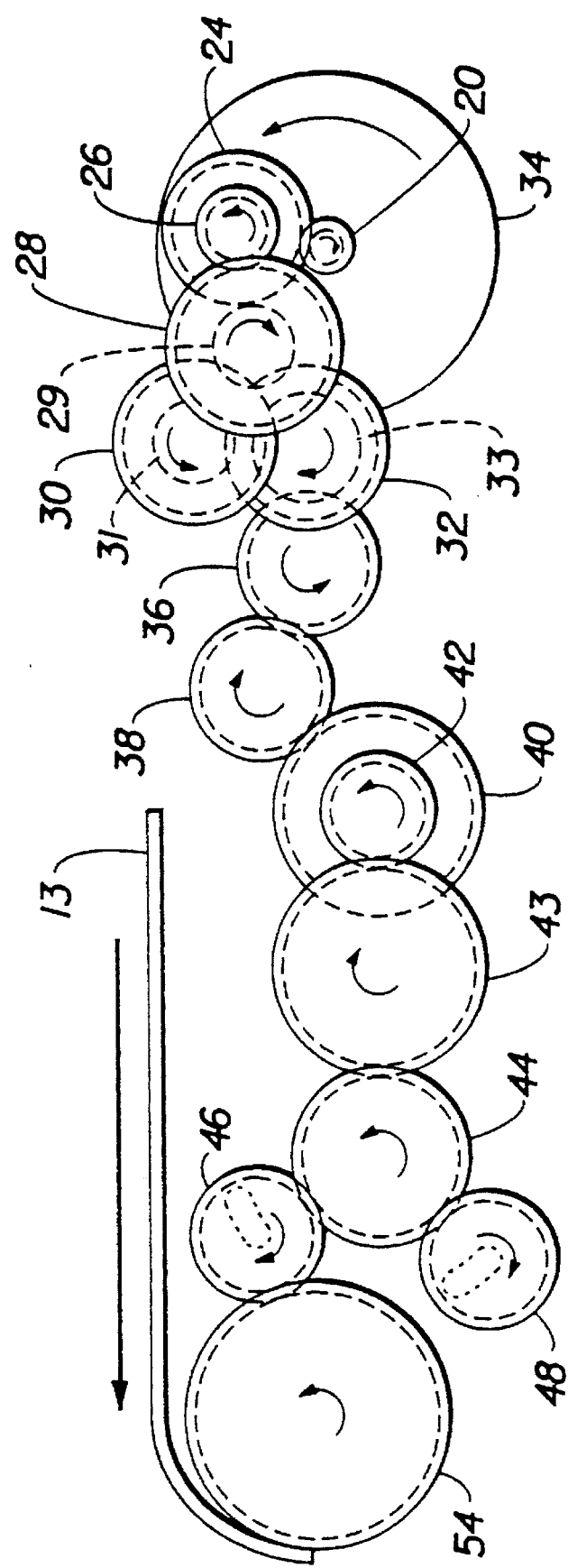
FIG. 4 is the top partial diagrammatic view of FIGS. 2 and 3 showing the rewinding mode of the film transporting apparatus.

Referring now to FIGS. 1 and 4, the rewind mode of the film transporting apparatus 10 is shown according to the present embodiment.

During the rewinding phase, the external switch or other equivalent means triggers the control circuit (not shown), activating the bi-directional motor 12 and causing the output shaft 22 to rotate in a counterclockwise direction, as shown by arrows 78. By complementary engagements with the respective elements of the gear train, the counterclockwise rotation of the output motor shaft 22 causes the driving gear 44 to rotate in a clockwise direction. Each of the engaged first and second displaceable gears 46, 48 are caused to translate in a clockwise fashion within their respective channels 50, 51 so that now the second displaceable gear 48 engages the spindle gear 54, causing the spindle gear to also rotate in a clockwise direction, or film rewinding direction which is imparted to the film spool (not shown). The film 13 is then rewound according to the direction shown by arrow 68 from the take-up spool 14 to the confines of the film cartridge 16.

Similarly, the counterclockwise rotation of the motor 12 and output shaft 22 causes the take-up spool gear 34 to also rotate in a clockwise or film rewinding direction.

During rewind, the film spool (not shown) of the cartridge 16 is powered by the action of the motor 12 and the associated gear train 23 due to the engagement of the second engagement gear 48 with the spindle gear 54. In the meantime, the first displaceable gear 46 while engaged with the output gear 44 remains unengaged relative to the spindle gear 54 and the film cartridge 16.

The invention has been described with reference to a preferred embodiment. However, it will be appreciated that variations and modifications can be effected by a person of ordinary skill in the art without departing from the scope of the invention.

PARTS LIST 10 film transporting apparatus
12 bi-directional motor
13 photographic film or filmstrip
14 take-up spool
16 film cartridge
20 motor pinion gear
22 motor output shaft
23 gear train
24 gear
26 integral pinion gear
28 gear
29 integral pinion gear
30 gear
31 integral pinion gear
33 pinion gear
32 gear
34 take-up spool gear
36 gear
38 gear
40 gear
42 pinion gear
43 gear
44 driving gear
46 first displaceable gear
48 second displaceable gear
50 slot/channel
51 slot/channel
54 spindle gear
58 filmstrip
60 hooks
62 perforations
66 arrow
68 arrow
72 gear plate
74 shaft
76 arrow
78 arrow

I claim:

1. A film transporting apparatus for moving film between a film cartridge and a take-up spool comprising:

a bi-directional motor rotatable in a first direction and a second direction opposite to the first direction;

a driving gear engaged with said motor and rotatable in a first and a second direction in response to the direction of rotation of said motor; and a pair of displaceable gears engageable with said driving gear for selectively engaging said film cartridge, wherein said film cartridge is of the thrusting type, which allows the cartridge to initially thrust a leading portion of a contained filmstrip to the take-up spool, is characterized in that:

each of said displaceable gears is independently movable along a slotted path for allowing said gears to move into and out of engagement with said film cartridge depending on the direction of rotation of said motor to allow either winding and rewinding of film out of and into said cartridge, wherein said apparatus includes clutch means for causing one of said displaceable gears to slip out of engagement with said thrusting film cartridge after the thrusted leading portion of the filmstrip has been coupled to said take-up spool during the unwinding of film from said cartridge and for causing the other said displaceable gear to move into engagement with the film cartridge during the rewinding of film into said cartridge.

2. An apparatus as recited in claim 1, wherein said pair of displaceable gears are independently coupled to a single output gear.

* * * * *

IN THE UNITED STATES PATENT AND TRADEMARK OFFICE
CERTIFICATE OF CORRECTION

PATENT NO.: 5,555,048
DATED: September 10, 1996
INVENTOR(S): Lee D. Oldfield It is certified that an error appears in the above-identified patent and that said Letters Patent is hereby corrected as shown below:

On the title page:

Please insert under --Item (56) References Cited, as follows:

U.S. PATENT DOCUMENTS

| | | | |
|---|---|---|---|
| 4,482,226 | 11/84 | Tamamura | 354/173.1 |
| 4,938,429 | 07/90 | Robertson et al. | 242/71.1 |
| 5,031,855 | 07/91 | Wolf et al. | 242/71.1 |
| 5,160,953 | 11/92 | Iwashita et al. | 354/173.1 |
| 5,172,148 | 12/92 | Ezawa | 354/173.1 |
| 5,200,777 | 04/93 | Zander et al. | 354/275 |
| 5,248,108 | 09/93 | Zander et al. | 242/71.1 |
| 5,323,197 | 06/94 | Alligood | 354/173.1 |
| 5,359,378 | 10/94 | Zander et al. | 354/275 |
| Re. 32,558 | 12/87 | Chan | 354/173.1 |

FOREIGN PATENT DOCUMENTS 4-86632-A 03/92 Japan.
4-125530-A 04/92 Japan.

Signed and Sealed this

Eleventh Day of February, 1997

Attest:

BRUCE LEHMAN

*Attesting Officer*     *Commissioner of Patents and Trademarks*